(12) United States Patent
Cabrey

(10) Patent No.: US 6,706,225 B2
(45) Date of Patent: Mar. 16, 2004

(54) LAMINATE COMPOSITE MATERIAL

(75) Inventor: Jennifer M. Cabrey, Jacksonville, FL (US)

(73) Assignee: Tyco Plastic Services AG, Schaffhausen (CH)

( * ) Notice: Subject to any disclaimer, the term of this patent is extended or adjusted under 35 U.S.C. 154(b) by 25 days.

(21) Appl. No.: 10/442,469

(22) Filed: May 21, 2003

(65) Prior Publication Data

US 2003/0201573 A1 Oct. 30, 2003

Related U.S. Application Data

(62) Division of application No. 09/399,890, filed on Sep. 21, 1999, now Pat. No. 6,602,809.

(51) Int. Cl.⁷ .................................................. D04H 1/20
(52) U.S. Cl. ....................... 264/112; 264/125; 264/128; 264/176.1; 264/239; 264/257; 427/202; 427/206
(58) Field of Search ................................. 264/112, 125, 264/128, 176.1, 239, 257; 427/202, 206

(56) References Cited

U.S. PATENT DOCUMENTS

| 6,117,438 A | 9/2000 | Topolkaraev et al. |
| 6,133,168 A | 10/2000 | Doyle et al. |

*Primary Examiner*—Ula C. Ruddock
(74) *Attorney, Agent, or Firm*—MacMillan, Sobanski & Todd; Donald R. Fraser

(57) ABSTRACT

A laminate composite material comprises a layer of an open weave supporting fabric having a layer of breathable resin adhered thereto by an extruded layer of a thermoplastic resin blended with a high temperature volatile particulate. The resultant composite material is substantially impervious to air and water and permeable to water vapor and having a water vapor transmission rate exceeding one (1) perm of water vapor.

7 Claims, No Drawings

LAMINATE COMPOSITE MATERIAL

This is a divisional of utility patent application Ser. No. 09/399,890 filed Sep. 21, 1999, now U.S. Pat. No. 6,602,809.

FIELD OF THE INVENTION

This invention relates generally to a laminate composite material having a water vapor transmission rate (WVTR) exceeding one (1) perm of water vapor where perm (permeance) is in grains/hr. ft.$^2$ in.Hg. More particularly, the invention is directed to a laminate composite material which substantially blocks the flow of air and water, but which allows the transmission therethrough of water vapor or moisture vapor. The composite material includes a layer of open weave supporting fabric and a film of a breathable resin wherein the layer and the film are adhered to one another by a high temperature volatile particulate added to a thermoplastic resin wherein the resultant composite material has a water vapor transmission rate exceeding one (1) perm of water vapor.

BACKGROUND OF THE INVENTION

It is known that breathable building wraps, also referred to as housewraps, are used and provide advantages in the construction of wall and roof assemblies. These housewrap materials improve energy loss through reduction of air infiltration as well as acting as a weather barrier by preventing water intrusion into the building. It is a requirement that these materials are breathable, as defined by a minimum level of water vapor transmission rate (WVTR). Two popular materials that are manufactured for housewrap that achieve the combination of a barrier to water intrusion and air infiltration while remaining permeable to moisture vapor are a flash spunbonded polyolefin that may be obtained from DuPont under the name Tyvek™. A second material is a microporous polyolefin film composite and may be obtained from Simplex Products under the trademark "R-Wrap™."

BACKGROUND OF THE PRIOR ART

It is known to use porous polyolefin films composites in housewrap applications. Housewrap materials must be permeable to gases as to allow water vapor to escape from the wall to which the film is secured. Otherwise, condensation of the water vapor trapped inside the wall may occur which leads to rotting and the growth of fungus, mold and mildew which may damage the wall. The film must be sufficiently impervious to air to insulate the wall against wind and water intrusion. Further, the film must have adequate tensile and physical properties such as break strength, elongation, tear strength, shrinkage and puncture strength to avoid damage during installation.

It is also known to prepare porous polyolefin films by stretching a precursor film filled with calcium carbonate. "Breathable" films which are gas/vapor permeable and liquid impermeable have been described in U.S. Pat. No. 4,472,328, assigned to Mitsubishi Chemical Industries, Ltd. The Mitsubishi patent describes a breathable polyolefin film prepared from a polyolefin/filler composition having from 20 percent to 80 percent by weight of a filler such as a surface treated calcium carbonate. A liquid or waxy hydrocarbon polymer elastomer such as a hydroxy-terminated liquid polybutadiene was found to produce a precursor film that could be monoaxially or biaxially stretched to make a film breathable. The breathable film described by Mitsubishi is also described in Great Britain Patent No. 2,115,702, assigned to Kao Corporation. The Kao patent further describes a disposable diaper prepared with a breathable film as disclosed by the Mitsubishi patent. The breathable film is used as a backing for the diaper to contain liquid.

It is also known to laminate porous polyolefin films, also referred to as microporous films, to open mesh fabrics as described in U.S. Pat. No. 4,929,303 assigned to Exxon Chemical. In the Exxon patent an open mesh fabric known under the trade designation CLAF, as manufactured by Amoco Fabrics, and a microporous film known under the trade designation Exxaire™, as manufactured by Exxon Chemical, are laminated together, without the addition of an adhesive. Wherein the fabric is heated on a hot roller and then pressed into contact with the unheated film creating a bond between the two layers. This technique is known in the art as "thermo bonding."

It is also known to bond or adhere two or more layers one to another with the use of various mastics or adhesive coatings. But use of most known adhesives, mastics and coatings when applied between a fabric layer and a microporous film seal the micropores of the film rendering it non permeable to water vapor and thus it becomes non functional and totally ineffective.

Further, as described in the Exxon patent an open mesh fabric is required in the composite to add strength and maintain permeability to water vapor and allow free passage of water vapor through the microporous film and continue generally unimpeded through the openings in the fabric.

It is known in the industry that when adhesive coatings are applied to open mesh fabrics it is possible for the adhesive to migrate through the openings in the fabric. This uncontrolled migration of adhesive, bonds each internal "top" layer to the succeeding "bottom" layer as the completed composite is rolled up on a take up reel. Hence, each concentric layer is bonded to the next on the accumulated roll and cannot later be unrolled. This is a highly undesirable condition unrolled condition known in the art as "blocking."

It is known to add high temperature volatile materials, sometimes referred to foaming agents to thermoplastics for the purpose of creating closed gas cells resulting in the lowering of the density of the finished material. This is a common practice in the injection molding process but not common in the extrusion film process.

SUMMARY OF THE INVENTION

There has surprisingly been discovered an adhesive material and process for applying same that would bond microporous films to open mesh fabrics that would avoid sealing of the micropores and thus maintain the high permeance (WVTR). Said adhesive material also avoid "block" of the internal layers within the rolled up composite.

Also contemplated is a process for preparing the laminated composite. The process comprises steps of specially preparing a polyolefin resin extruding that resin through a die to form an adhesive layer between a microporous film and an open mesh fabric. The resulting composite would be substantially impervious to water and air yet having a high water vapor transmission rate (WVTR) and would exceed a minimum of 1 perm of water vapor. The invention utilizes conventional equipment that is well known in the art.

The laminate composite according to the present invention is especially well suited as a building wrap or roof underlayment but could be useful in other industrial and consumer applications.

DETAILED DESCRIPTION OF THE PREFERRED EMBODIMENTS

The laminate construction material according to the present invention comprises a layer of an open weave supporting fabric adhered to a microporous or a monolithic film by a layer of dry adhesive slit film that is heated and then introduced between said layers thus acting as a bonding agent. The film layer may be microporous or monolithic, being substantially impervious to water and air and having a water vapor transmission rate greater than 1 perm. A microporous film is manufactured by conventional methods of extrusion or casting a polyolefin resin with added fillers followed by monoaxially or biaxially stretching as to form interconnected voids. A preferred microporous film is designated under the name Exxaire™ and obtained from Exxon Chemical (now Tredegar).

The composite material of the present invention may be prepared by utilizing conventional extrusion and laminating equipment. The prepared resin with a high temperature volatile particulate additive is melted in a conventional extruder and extruded through a die to form a layer of molten resin which is deposited onto the web of open weave supporting fabric. Simultaneously a web of microporous film is introduced on the opposite side facing the open mesh fabric. The entire assemblage is passed through the nip of two rolls. One nip roll has a controlled temperature that chills the molten resin and causes it to solidify, while the other nip roll is used to control nip pressure. The simultaneous combination of solidifying and pressing in this nip results in a permanent bond between the layers of fabric and microporous film thus forming the composite. The resultant laminated material is accumulated onto a take-up reel. The processes for extruding a layer of a polymer onto a supporting fabric web and laminating the plies together are more fully set forth in U.S. Pat. No. 5,554,246 to Anwyll, Jr. which is incorporated herein in its entirety by reference thereto.

The high temperature volatile particulate is widely dispersed throughout the polyolefin resin through conventional methods and becomes activated by heat and pressure during the process of extrusion. As the molten resin begins to exit the die, the activated particles volatilize and form numerous cells created by expansion of gas within the molten resin. The expanding gas creates both closed and open cells. These cells cause multitudinous interruptions in what otherwise would be a continuous barrier of thermoplastic film as it is extruded from the die. These multitudinous interruptions create both micropores and/or macro voids in the extruded thermoplastic layer providing "breathable openings" that allow passage of water vapor throughout the composite. The molten resin becomes solid when it contacts the chilled roll at the nip. After the resin has become solidified it is no longer in a tacky state and hence "blocking" of the final accumulated roll of material is avoided.

It is important to control the size and number of gas cells in the thermoplastic resin as it exits the extrusion die. This is accomplished by careful control of a combination of factors including melt index, amount and type of volatile particulate, the temperature settings of the extruder, screw speed, screen pack, back pressure, line speed and the resin thickness. An extruded thermoplastic bonding layer may also be achieved through the addition of moisture to the resin prior to the extrusion process which results in extrusions of an adhesive layer with much larger void areas.

The bonding adhesive film may be any thermoplastic resin that has been blended with any high temperature volatile particulate. A preferred resin is a polyolefin designated as NA593 obtained from Equistar. A preferred high temperature volatile particulate is FM 3061 obtained from Ampacet, Cincinnati, Ohio. The high temperature volatile particulate is blended with the resin utilizing equipment that is well known in the art.

The open weave supporting fabric suitable for use according to the present invention may be any open weave sheet material that is known to be useful for preparing reinforced laminated sheet or rolled materials. Examples of useful open weave supporting fabrics include, but are not necessarily limited to, high, medium, and low density polyethylene, polypropylene, and polybutylene fiber matts, as well as matts made from blends of copolymers of polyethylene, polypropylene, polyester, fiberglass and polybutylene fibers. Additionally, the open weave supporting fabric may comprise glass or graphite fibers with or without an organic or inorganic binder. Furthermore, the open weave supporting fabric may contain fibers made from fiberglass, polyolefins, polyesters, acrylics, polycarbonates, polyurethanes, and the like, as well as blends and copolymers thereof. By the term "open weave" as it is used herein is meant a woven or non-woven matt of fibrous material and may be constructed of natural or synthetic fibers and may be spunbond or meltblown. A preferred open weave supporting fabric is a high density polyethylene fiber fabric which may be obtained from Amoco Fabrics and Fibers Company of Atlanta, Ga. under the trade designation "CLAF."

The resulting laminate construction material substantially prevents the passage therethrough of air and water, but allows the transmission of water vapor at a rate exceeding 1 perm of water vapor.

EXAMPLE

A polyethylene resin (NA593) is blended with a high temperature volatile particulate (AMPACET #FM 3061) and extrusion coated at a temperature of about 400° F. onto a moving web of an open weave supporting fabric (CLAF) at a rate so as to form a layer of resin about 1.5 mil thick. The open weave supporting fabric having the resin layer thereon passes through the nip of two rolls. Simultaneously a web of microporous film is introduced into the same nip on the opposite side, yet facing extruded resin upon the open mesh fabric. The one nip roll has a controlled temperature of about 65° F. that chills the molten resin and causes it to solidify, while the other nip roll controls nip pressure to about 40 PSI. The simultaneous combination of solidifying and pressing that occurs at this nip results in a permanent bond between the layers of fabric and microporous film thus forming the composite. The resultant laminated material is accumulated onto a take-up reel for subsequent use as a building wrap or roofing underlayment. The laminate construction material substantially blocks the flow therethrough of water and air and has a WVTR exceeding 1 perm of water vapor.

This Example may be repeated with similar success by substituting the generically or specifically described materials or conditions recited herein for those set forth in the preceding Example.

From the foregoing description, one ordinarily skilled in the art can easily ascertain the essential characteristics of the invention and, without departing from its spirit or scope, can make various changes and modifications to adapt the invention to various uses and conditions.

What is claimed is:

1. A method of making a laminate composite material comprising the steps of:

a) providing a layer of an open weave supporting fabric;

b) providing a layer of a breathable resin onto the layer of supporting fabric, said resin layer being substantially impervious to air and water and permeable to water vapor; and c) providing a layer of a thermoplastic resin blended with a high temperature volatile particulate to be extruded between said layer of breathable resin and said layer of supporting fabric, wherein the resultant laminate composite material has a water vapor transmission rate exceeding 1 perm of water vapor.

2. The method of making a laminate composite material according to claim 1, wherein said open weave supporting fabric comprises fibers of high, medium, or low density polyethylene, polypropylene, or polybutylene, or copolymers thereof, glass, graphite, polyester, acrylic, polycarbonate, or polyurethane.

3. The method of making a laminate composite material according to claim 1, wherein said resin comprises a copolymer of ethylene and methyl acrylate or a polyester copolymer.

4. The method of making a laminate composite material according to claim 1, further comprising a step of adding a breathable adhesive material between said layer of open weave fabric and said layer of breathable resin to effect adherence between said layer of open weave fabric and said layer of breathable resin.

5. The method of making a laminate composite material according to claim 4, wherein said breathable adhesive is a thermoplastic film.

6. The method of making a laminate composite material according to claim 5, wherein said thermoplastic film is provided with a high temperature volatile particulate extruded between said layer of fabric and said layer of breathable resin.

7. The method of making a laminate composite material according to claim 4, wherein said breathable adhesive includes open cell foam agents creating a non-continuous film layer between said supporting fabric and said breathable resin.

* * * * *